Aug. 26, 1969  KOICHIRO KUBO ET AL  3,463,528
AUTOMATIC KNOTTER

Filed Jan. 15, 1968  6 Sheets-Sheet 1

United States Patent Office 3,463,528
Patented Aug. 26, 1969

3,463,528
AUTOMATIC KNOTTER
Koichiro Kubo, Fumitaka Omori, and Munehisa Murai, Kyoto, Japan, assignors to Shimadzu Seisakusho Ltd., and Todo Seisakusho Ltd., Kyoto, Japan, a corporation of Japan
Filed Jan. 15, 1968, Ser. No. 697,971
Claims priority, application Japan, Jan. 17, 1967, 42/3,287
Int. Cl. D03j 1/16
U.S. Cl. 289—3                                   14 Claims

ABSTRACT OF THE DISCLOSURE

An automatic knotting machine having a rotatable tying bill and yarn guiding levers that cooperate to tie two strands of yarn together into a weavers knot and a pair of cutter blades to trim the surplus yarn tails after the knot is tied.

---

This invention relates to an automatic knotter for use in automatic winding machines and, more particularly, to an automatic knotter for tying together the ends of two strands of yarn into a weaver's knot.

In an automatic winding machine, a strand of yarn or the like is continuously withdrawn from a supply of yarn, say, a cop so as to be wound onto a cheese. When the cop has been consumed, the rear end of the yarn that has been wound onto the cheese must be tied to the forward end of the yarn on a new cop; or when here is a break in the running strand, the broken ends must be tied together. There are several methods of tying such two strand ends together, which may be distinguished from each other by the knots formed as a result of tying. The method with which this invention is concerned is that of tying two strands into a weaver's knot.

It is necessary that the ends of the strands should be tied together into a knot and that the knot should be so tightly formed that upon subsequent winding of the strand the knot may not be undone, with one of the tied ends slipping out of the knot due to the tension applied thereto in the winding operation. It is also necessary that the finished knot should have ends or tails trimmed to as short and equal lengths as possible, since longer tails would obtrusively appear standing from the surface of the cloth although they might help prevent the strand ends slipping out of the knot.

To the best knowledge of the present inventors, however, there have been proposed no automatic knotters of the present type which fully meet the above requirements.

Accordingly, one object of the invention is to provide an automatic knotter for tying two strands of yarn or the like in a weaver's knot.

Another object of the invention is to provide an automatic knotter of the type aforesaid which is capable of tying two strands of yarn or the like in a weaver's knot so tightly formed that it will never be loosened or undone.

Still another object of the invention is to provide an automatic knotter of the type aforesaid which is capable of tying two strands of yarn or the like in a very tight weaver's knot having tails trimmed to as short and equal lengths as possible so that they may not obstrusively appear in the surface of a woven cloth.

Still another object of the invention is to provide an automatic knotter of the type aforesaid which is reliable in operation even at a very high running speed and simple in construction.

Other objects of the invention with its features and advantages will become apparent from the following detailed description of some preferred embodiments thereof with reference to the accompanying drawings, wherein like reference numerals denote like parts throughout the figures, and wherein:

Figure 1:
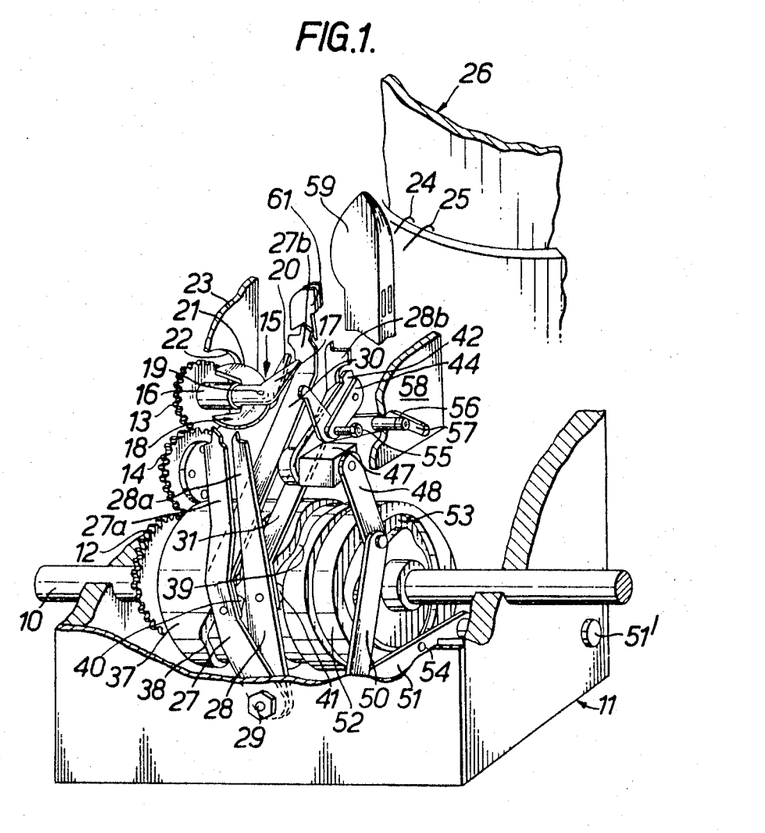
FIG. 1 is a partly cut-away, perspective view of an automatic knotter embodying the invention.

Referring first to FIG. 1 there is shown a drive shaft 10 journaled on a pair of opposite side walls of a machine frame or casing 11 and driven by a prime mover, not shown. A gear 12 is rigidly mounted on the shaft 10 for rotation therewith and meshes with a pinion gear 13 through an intermediate gear 14. A tying bill 15 comprises a cylindrical shank portion 16 to the bottom of which the pinion gear 13 is secured and a pair of bill pieces 17 extending laterally of the shank portion and facing sidewise each other across a small gap. A bill cutter 18 is pivoted on the shank portion 16 as at 19 and has its blade 20 interposed between the bill pieces 17 to form a cutter. The bill cutter also has its rear portion flared outwardly to provide a camming surface 21 which cooperates with a corresponding camming surface 22 formed in a fixed plate 23 so as to encircle the flared portion of the bill cutter. It will be easily seen that as the tying bill is rotated, the camming surfaces 21 and 22 cooperate to pivot the bill cutter 18 on the pin 19 thereby to open and close the mouth of the bill, which cuts a strand of yarn and seizes the cut end in the well known manner.

Figure 3:
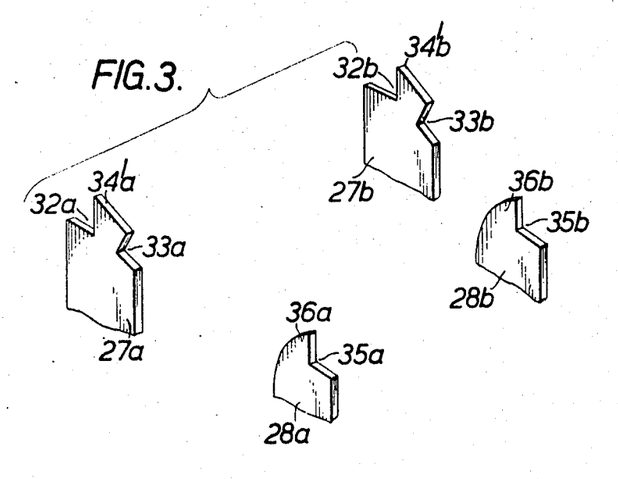
FIG. 3 is a perspective view of a portion of FIG. 1 or 2, showing the upper ends of two pairs of yarn-guiding lever fingers.

A pair of strands 24a and 25b to be tied together, which may, for example, be a strand of yarn unwound from a cop and a strand of yarn wound onto a cheese, respectively, are supported so as to extend substantially in parallel with each other and transversely of the axis of rotation of the tying bill 15, with the cop yarn extending crosswise of the shank portion of the tying bill. The outer ends of the cop and cheese yarns 24 and 25 are drawn into a suitable suction device 26 as is well known in the art. A pair of yarn-guiding levers or arms 27 and 28 have their respective lower ends pivoted as at 29 on the front wall of the casing 11. The levers 27 and 28 have a pair of fingers 27a, 27b and 28a, 28b spaced by connecting bars 30 and 31, respectively, a predetermined distance apart transversely of the axis of the shank portion 16 of the tying bill. The fingers 27a and 27b are provided at their respective upper ends with notches 32a, 33a and 32b, 33b, respectively, formed at the opposite sides of claws 34a and 34b; and the fingers 28a and 28b are provided at their respective upper ends with notches 35a and 35b at one side of claws 36a and 36b, respectively. The notches 32a and 32b are directed leftward in FIG. 1 or 3, while the notches 33a, 33b and 35a, 35b are directed rightward in FIG. 1 or 3. As most clearly shown in FIG. 4, the notches (33a, 33b,) 35a and 35b are at a level engageable with the cop yarn 24 which is at a level a little higher than that of the shank portion of the tying bill but not engageable with the cheese yarn 25 which is at a level a little higher than the cop yarn; while the notches 32a and 32b are at a level engageable with the cheese yarn 25.

Figure 4:
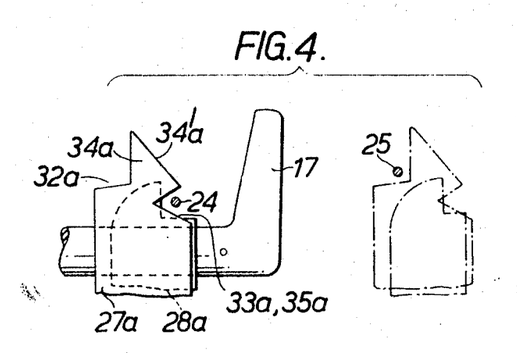
FIG. 4 is a side view of FIG. 3, showing the relative positions of the two strands of yarns to be tied together and the yarn-guiding lever fingers.
Figure 7A:
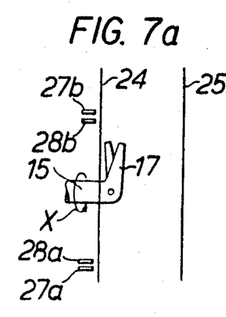
FIGS. 7a through 7i are views schematically showing the various elements of the knotter of FIG. 1 in different operative positions.
Figure 7B:
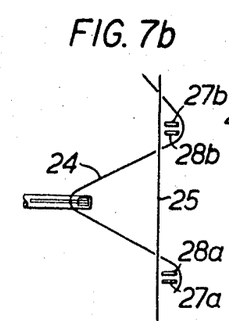
Figure 8A:
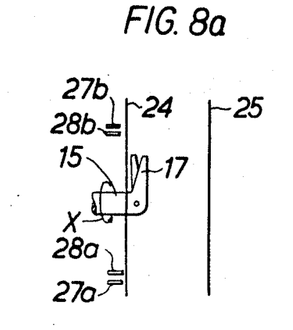
FIGS. 8a through 8i are views schematically showing the various elements of the knotter of FIG. 2 in different operative positions.
Figure 8B:
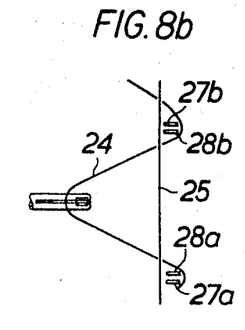
Figure 8C:
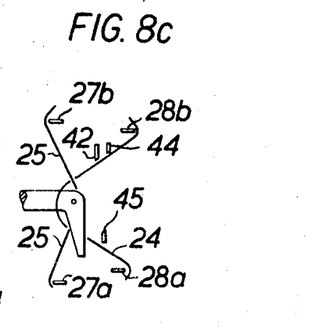
Figure 8D:
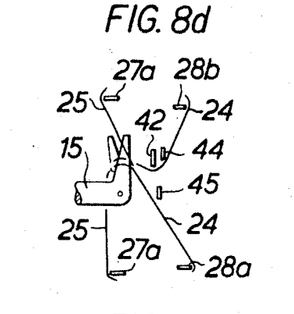
Figure 8E:
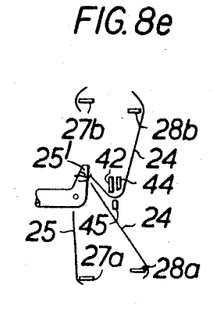

The levers 27 and 28 rock on the pivot pin 29 so that the fingers 27a, 27b and 28a, 28b move relative to the tying bill axially thereof, starting the leftmost position axially inward of the shank of the bill where the fingers are laterally aligned as shown in FIGS. 4, 7a and 8a, then moving away from the tying bill to pass rightward under the cheese yarn 25 to the rightmost position and then back to the original leftmost position, although the two pairs of fingers move in different phases, as will be described later in detail.

To effect the rocking motion of the levers 27 and 28, there is rigidly mounted on the shaft 10 for rotation therewith a barrel 37, about the peripheral surface of which are formed a pair of camming grooves 38 and 39 in which roller cam followers 40 and 41 mounted on the levers 27 and 28 engage, respectively. The grooves 38 and 39 are so configured as to effect the desired relative rocking movement of the two levers 27 and 28.

Figure 5:
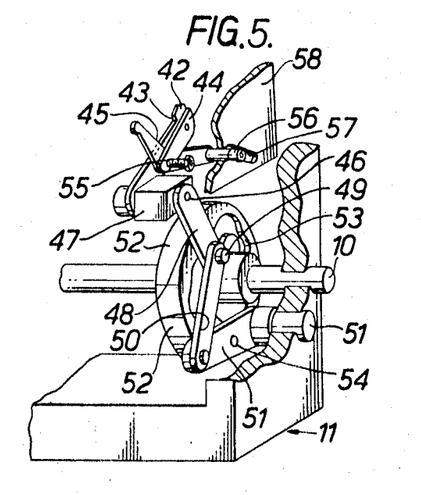
FIG. 5 is a perspective view of another portion of FIG. 1 or 2, showing a third warn-guiding lever with a pair of cutter blades and their driving mechanism.

During one rocking cycle of the levers 27 and 28, the tying bill is rotated twice, during which time the two strands 24 and 25 are wound about the tying bill and formed into a weaver's knot as they are stripped therefrom, with the cheese yarn at one side of the knot having been cut and seized by the bill cutter, as will be described later. A third guiding lever 42 has a notch 43 engageable with the cop yarn at one side of the knot to move the yarn in such a direction as to strip the knot from the tying bill. The knot is then tightened and the surplus end of the cop yarn is cut by another cutter comprising a pair of blades 44 and 45 (FIG. 5). The lever 42 has its lower end rigidly mounted on a pin 46 journaled on a fixed block 47. A lever 48 has its one end rigidly connected to the pin 46 and its opposite end pivoted by a pin 49 to a link 50, which is in turn pivoted to a crank lever 51 having a crank shaft 51' journaled on one side wall of the casing 11. A disc 52 is rigidly mounted on the drive shaft 10 for rotation therewith and has a camming groove 53 formed on one end surface thereof, in which a roller cam follower 54 mounted on the lever 51 engages.

The cutter blade 44 is fixedly mounted on the guiding lever 42 for movement therewith, while the other cutter blade 45 is pivoted at about its mid point on the guiding lever 42 by a pin 55 for movement relative to the lever 42 and has its rear end provided with a roller cam follower 56 engaging in a camming slot 57 formed in a fixed plate 58 (FIG. 5). It will be easily seen that as the shaft 10 is rotated, the guiding lever 42 is turned counter-clockwise in FIG. 5. This moves the roller 45 in the camming slot 57, so that the blade 45 is turned clockwise on the pin 55 to engage with the blade 44 to cut the surplus end of the cop yarn, as will be described in detail later.

Figure 6:
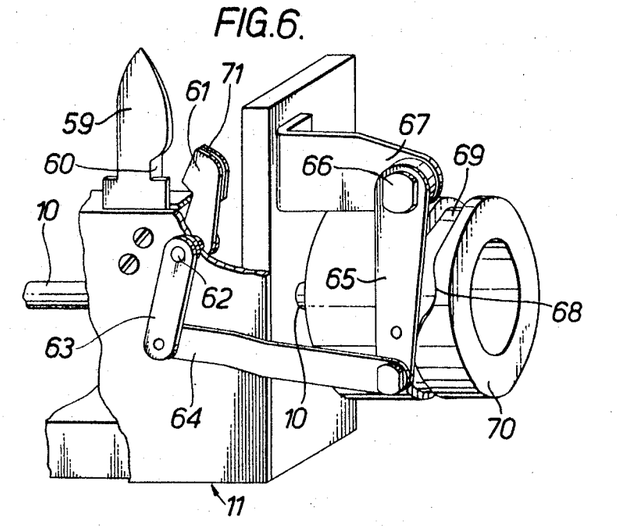
FIG. 6 is a perspective rear view of still another portion of FIG. 1 or 2, showing a yarn-clamping means.

While the cop yarn is guided by the lever 42 and cut by the blades 44 and 45, its end must be clamped or retained to help remove the knot from the tying bill and tighten the knot. To this end, as shown in FIG. 6, a stationary arm 59 is planted on the upper edge of the rear wall of the casing 11. The arm has a plurality of teeth 60. A movable arm 61 is fixed to a pin 62 journaled in the casing rear wall. The pin 62 is connected to a linkage comprising links 63, 64 and 65. The link 65 is pivoted by a pin 66 on a bracket 67 fixed to the casing side wall and has a cam follower 68 engaging in a cam groove 69 formed in the peripheral surface of a barrel 70 mounted on the drive shaft 10 for rotation therewith. As the shaft 10 is rotated, the arm 61 moves toward and away from the arm 59. The arm 60 has a plurality of teeth 71 which mesh with the teeth 60 on the arm 59.

The operation of the mechanism shown in FIG. 1 will now be described with reference to FIGS. 7a through 7i.

One end (the upper end) of the cop yarn 24 is drawn into the suction device 26 shown in FIG. 1 but not in FIGS. 7a–7i while the opposite end (the lower end) thereof comes from a cop, not shown. Similarly, one end (the upper end) of the cheese yarn 25 is drawn into the suction device while the opposite end (the lower end) thereof leads onto a cheese, not shown. As previously mentioned, the two strands of yarn are supported substantially parallel with each other and transversely of the axis of rotation of the tying bill 15, with the cop yarn extending crosswise of the shank portion of the tying bill, and the cheese yarn being spaced a predetermined distance apart from the cheese yarn.

Figure 7C:
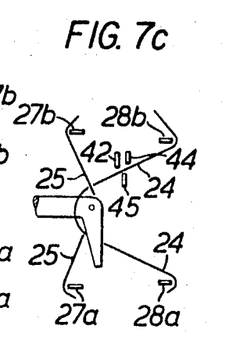
Figures 7D, 7E:
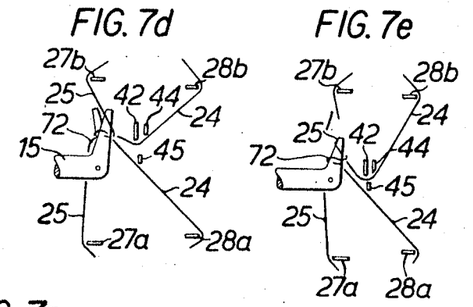
Figure 7F:
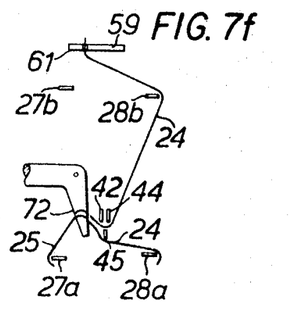
Figures 7G, 7H:
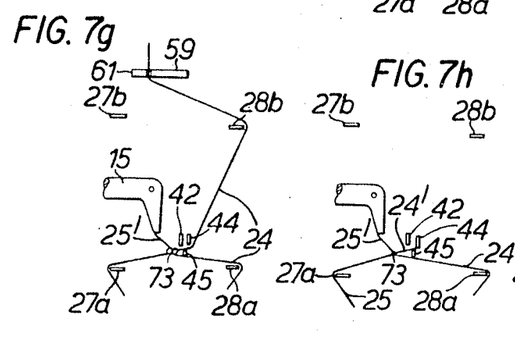
Figure 7I:
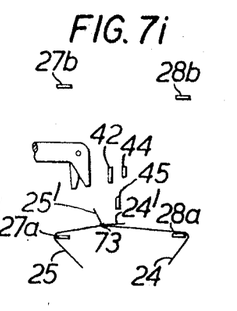

At the starting position of FIG. 7a, the fingers 27a, 28a and 27b, 28b are laterally aligned at the leftmost position at the lefthand side of the cop yarn 24. As the drive shaft 10 is rotated, the tying bill 15 is rotated in the direction of an arrow X and at the same time the fingers 27a, 27b and 28a, 28b move rightward into the position of FIG. 7b, carrying along with them the portions of the cop yarn engaged by the notches 33a, 33b, 35a, 35b (see also FIG. 4) to pass below the cheese yarn 25, with the intermediate portion of the cop yarn having been engaged and held by the lateral extension 17 of the bill that has now turned about a quarter of a revolution from the position of FIG. 7a. As the drive shaft 10 is further rotated, the fingers 27a and 27b only move backward from the rightmost position of FIG. 7b, carrying the cheese yarn 25 along with them by means of the notches 32a and 32b (FIG. 4). It may be mentioned that when the fingers 27a, 27b, 28a, 28b moved into the rightmost position of FIG. 7b, the cheese yarn 25 slipped over the sloping edges 34'a, 34'b of the claws 34a and 34b, of the fingers 27a and 27b thereby allowing the fingers to pass below the cheese yarn. However, when the fingers 27a and 27b return, the notches 32a and 32b engage with the cheese yarn to carry it along with them as far as the portion of the yarn intermediate the fingers 27a and 27b is engaged by the tying bill 15, as shown in FIG. 7c. As the tying bill is further rotated, the two strands of yarn are wound about the lateral extension 17 of the tying bill to form loops 72 thereon entangled with each other. Then, the bill opens its mouth (FIG. 7d) and then closes the same, thereby cutting the cheese yarn adjacent the loops at the side of the finger 27b (FIG. 7e). The cut end 25' of the cheese yarn 25 is kept seized in the mouth of the tying bill, and as the bill is further rotated the loops 72 begin to be stripped from the bill by the guiding lever 42 pushing the cop yarn 24 adjacent the loops at the side of the finger 28b transversely of the axis of rotation of the bill toward the finger 28b (FIGS. 7e and 7f). As the loops slip off from the bill, the cut end 25 of the cheese yarn still seized in the mouth of the bill is passed through the loops, thereby forming a weaver's knot 73 (FIG. 7g). When the knot has left the tying bill, the cut end 25' of the cheese yarn is still seized by the bill and the cheese yarn 25 at the opposite side of the knot is engaged and held by the finger 27a. On the other hand, the cop yarn 24 is clamped at its outer end by the clamping arms 59 and 61 and engaged by the guiding lever 42 adjacent the knot at the side of the finger 28b so as to extend substantially parallel with the portion of the yarn at the opposite side of the knot which is engaged and held by the finger 28a. Under the condition, as the finger 28a (and 28b) is moved further rightward, the two strands of yarn are tensioned, thereby tying the knot more tightly. When the knot has thus been sufficiently tightened, the cutter blades 44 and 45 are operated to cut off the surplus end of the cop yarn so as to leave a tail 24' of substantially the same length as that of the tail 25' of the cheese yarn (FIG. 4i).

Figure 2:
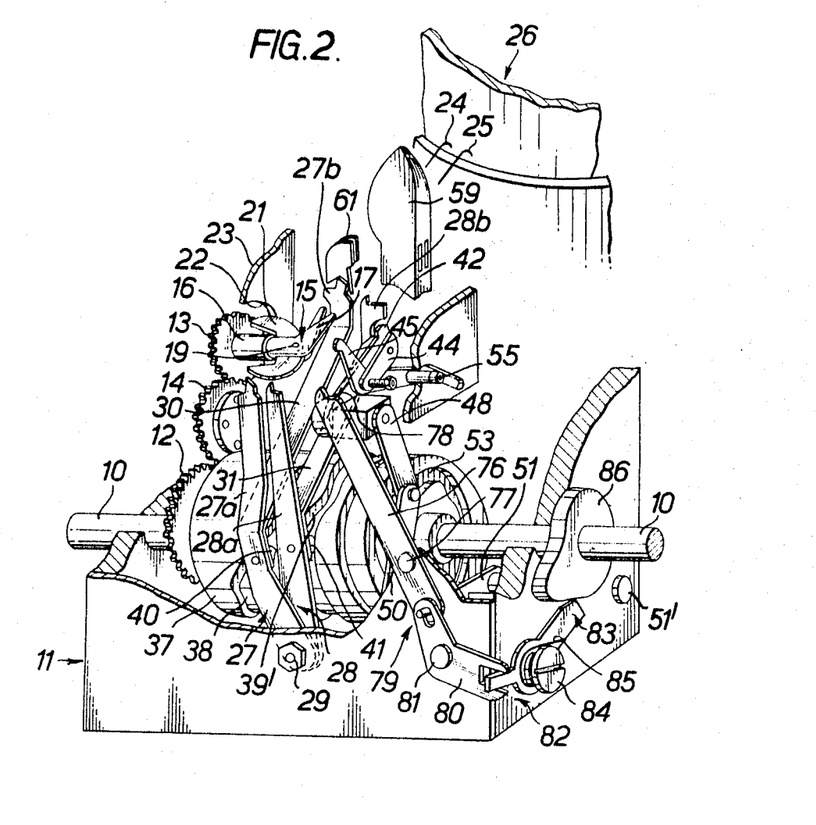
FIG. 2 is a view similar to FIG. 1 but showing another embodiment of the invention.

It will be seen that the lever 28 has two functions, one of which is to guide the cop yarn and the other, to give it tension. In some instances, however, design requirements do not provide a sufficient space for the lever 28 to travel a distance long enough to give the cop yarn the required degree of tension. In this case, the latter function of the lever 28 may advantageously be taken over by a different lever 76 as shown in FIG. 2. The lever 76 is pivoted intermediate of its length on the front wall of the casing 11 by a pin 77 and has its upper edge formed with a notch 78 and its lower end connected by a pin-and-slot connection 79 to one end of a lever 80 pivoted on the casing front wall by a pin 81. The lever 80 has its opposite end connected by a finger-and-slot connection 82 to one end of a lever 83 pivoted on the casing side wall by a pin 84. A spring 85 biases the lever 83 counter-clockwise so that the other end of the lever 83 bears against the peripheral surface of a cam 86 mounted on the drive shaft 10 for rotation therewith. In FIG. 2 the other mechanical elements are the same as those in FIG. 1 and designated by the same reference numerals, so that no explanation about them will be necessary, except that the configuration of the camming groove 39' differs from the corresponding groove 39 of FIG. 1.

Figure 8F:
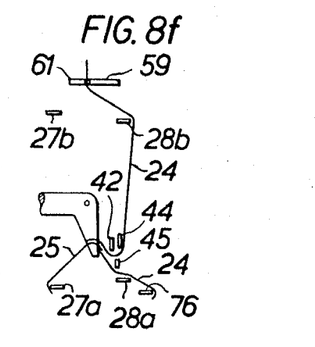
Figure 8G:
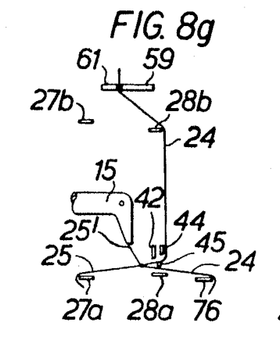
Figure 8H:
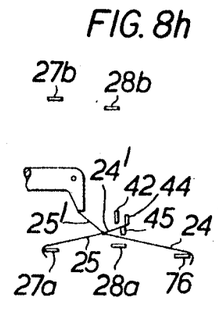
Figure 8I:
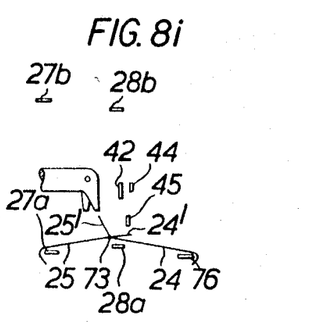

FIGS. 8a through 8i schematically show the operation of the mechanism of FIG. 2. It is substantially the same as that shown in FIGS. 7a through 7i, so that no explanation will be necessary, except for the following: In FIG. 8f, the tensioning lever 76 is shown engaging with the cop yarn 24 in place of the finger 28a so as to carry the same farther rightward to the positions shown in FIGS. 7g, 7h and 7i, thereby giving the cop yarn the required degree of tension.

Having illustrated and described preferred embodiments of the invention, it is understood that they are merely representative and that there may be many changes and modifications without departing from the scope of the invention. For example, the fingers 27b, 28b may be carried by individual levers similar to the levers 27 and 28, with two additional camming grooves of the required configurations being provided to guide such added levers.

What we claim is:

1. A knotter for automatically tying together a first and a second strand of yarn in a weaver's knot, comprising: a tying bill rotatable about an axis; means for supporting said strands so as to extend substantially transversely of said axis of rotation of said tying bill; first guiding means engageable with said first strand; second guiding means engageable with said second strand; first drive means for moving away from said tying bill axially thereof said first guiding means, which carries along with it said first strand, with a portion thereof being engaged and held by said tying bill; second drive means for moving toward said tying bill axially thereof said second guiding means, which carries along with it said second strand as far as said second strand is engaged at a portion thereof by said tying bill; means for rotating said tying bill about its axis so that said strand portions are wound thereon to form loops entangled with each other; means for causing said tying bill to open and close its mouth as it is rotated, thereby cutting said second strand adjacent said loops and seizing said cut end; means for temporarily clamping drive means for moving said third guiding means engaging said tying bill to be formed into a knot, with said seized cut end of said second strand having been passed through said loops as they are stripped off from said tying bill; said first, second and third guiding means, said clamping means and said tying bill cooperating to act on said strands adjacent said knot so as to tighten said knot; and means for cutting said first strand adjacent said knot at said clamped side.

2. The knotter of claim 1, wherein said first guiding means comprises a first guiding lever having a pair of fingers each having a claw engageable with said first strand at one of two spaced-apart points; said second guiding means comprises a second guiding lever having a pair of fingers each having a claw engageable with said second strand at one of two spaced-apart points; and said third guiding means comprises a third guiding lever having a claw engageable with said first strand adjacent said knot at said clamped side thereof.

3. The knotter of claim 2, wherein said first drive means comprises a drive shaft, a first cam mounted thereon for rotation therewith and a first cam follower fixed to said first guiding lever for engagement with said first cam; said second drive means comprises a second cam mounted on said drive shaft for rotation therewith and a second cam follower fixed to said second guiding lever for engagement with said second cam; and said third drive means comprises a third cam mounted on said drive shaft for rotation therewith, a third cam follower engaging with said third cam and a linkage connected to said third cam follower for a drive connection between said drive shaft and said third guiding lever.

4. The knotter of claim 2, wherein said cutting means comprises a pair of cutter blades, one of which is carried by said third guiding lever for movement therewith while the other is mounted on said same third guiding lever for pivotal movement relative thereto and to said one blade, and means operable in cooperation with said third driving means to effect said pivotal movement of said other blade to cause said blades to engage with each other, thereby cutting said first strand guided by said third guiding means adjacent said knot at said clamped side thereof.

5. The knotter of claim 1, wherein said clamping means comprises a pair of clamping members one of which is mounted for pivotal movement relative to the other into engagement therewith and means for effecting said pivotal movement of said one member so that said pair of members temporarily clamp said first strand adjacent said one side of said loops while said loops are being stripped off from said tying bill and the resulting knot, tightened.

6. The knotter of claim 1, wherein said strand supporting means includes a suction device for applying suction to the ends of said first and second strands to cause them to extend substantially in parallel with each other and transversely of said axis of rotation of said typing bill.

7. A knotter for automatically tying together a first and a second strand of yarn in a weaver's knot, comprising: a tying bill rotatable about an axis; means for supporting said strands so as to extend substantially transversely of said axis of rotation of said tying bill; first guiding means engageable with said first strand; second guiding means engageable with said second strand; first drive means for moving away from said tying bill axially thereof said first guiding means, which carries along with it said first strand, with a portion thereof being engaged and held by said tying bill; second drive means for moving toward said tying bill axially thereof said second guiding means, which carries along with its said second strand as far as said second strand is engaged at a portion thereof by said tying bill; means for rotating said tying bill about its axis so that said strands are wound thereabout to form loops entangled with each other; means for causing said tying bill to open and close its mouth as it is rotated, thereby cutting said second strand adjacent said loops and seizing said cut end; means for temporarily clamping said first strand at one side of said loops; third guiding means engageable with said first strand adjacent said loops at said clamped side; third drive means for moving said third guiding means engaging said first strand so that said loops are stripped off from said tying bill to be formed into a weaver's knot, with said seized cut end of said second strand having been passed through said loops as they are stripped off from said tying bill; fourth guiding means engageable with said first strand at the other side of said loops; fourth drive means for moving said fourth guiding means axially of said tying bill farther away therefrom beyond said first guiding means so as to draw and tension said first strand in place of said first guiding means thereby to tighten said knot in cooperation with said tying bill, second guiding means, third guiding means and clamping means; and means for cutting said first strand adjacent said knot at said clamped side thereof.

8. The knotter of claim 7, wherein said first guiding means comprises a first guiding lever having a pair of fingers each having a claw engageable with said first strand at one of two spaced-apart points; said second guiding means comprises a second lever having a pair of fingers each having a claw engageable with said second strand at one of two spaced-apart points; said third guiding means comprises a third guiding lever having a claw engageable with said first strand adjacent said knot at said clamped side thereof; and said fourth guiding means comprises a fourth guiding lever having a claw enageable with said first strand adjacent said one point in place of one of said guiding lever finger claws.

9. The knotter of claim 8, wherein said first drive means comprises a drive shaft, a first cam mounted thereon for rotation therewith and a first cam follower fixed to said first guiding lever for engagement with said first cam; said second drive means comprises a second cam mounted on said drive shaft for rotation therewith and a second cam follower fixed to said second guiding lever for engagement with said second cam; said third drive means comprises a third cam mounted on said drive shaft for rotation therewith, a third cam follower engaging with said third cam and a linkage connected to said third cam follower for a drive connection between said drive shaft and said third guiding lever; and said fourth drive means comprises a fourth cam mounted on said drive shaft for rotation therewith, a fourth cam follower engaging with said fourth cam and a linkage connected to said fourth cam follower for a drive connection between said drive shaft and said fourth guiding lever so as to move said fourth guiding lever engaging with said first strand in place of said first guiding lever farther away from said tying bill beyond the distance of travel of said first guiding lever.

10. The knotter of claim 8, wherein said cutting means comprises a pair of cutter blades, one of which is carried by said third guiding lever for movement therewith while the other is mounted on said same third guiding lever for pivotal movement relative thereto and to said one blade, and means operable in cooperation with said third driving means to effect said pivotal movement of said other blade to cause said blades to engage with each other, thereby cutting said first strand guided by said third guiding means adjacent said knot at said clamped side thereof.

11. The knotter of claim 7, wherein said clamping means comprises a pair of clamping members one of which is mounted for pivotal movement relative to the other into engagement therewith and means for effecting said pivotal movement of said one member so that said pair of members temporarily clamps said first strand at said one side of said knot while said loops are being stripped off from said tying bill and the resulting knot, tightened.

12. The knotter of claim 7, wherein said strand supporting means include a suction device for applying suction to the ends of said first and second strands to cause them to extend substantially in parallel with each other and transversely of said axis of rotation of said tying bill.

13. A knotter for automatically tying together a first and a second strand of yarn in a weaver's knot, comprising: a tying bill rotatable about an axis and comprising an axial extension and a lateral extension constituting its mouth; means including a suction device for supporting portions of said strands so as to extend substantially in parallel with each other and transversely of said axis of rotation of said tying bill by the help of suction being applied to the ends of said strands, with said first strand being supported crosswise of said axial extension of said tying bill; a first guiding lever mounted for pivotal movement and having a first pair of fingers each having a claw engageable with said first strand at one of two spaced-apart points thereof; a drive shaft; a first cam mounted on said drive shaft for rotation therewith; a first cam follower fixed to said first guiding lever for engagement with said first cam so as to cause movement of said first guiding lever away from said tying bill axially thereof, said first pair of fingers carrying along with them the portions of said first strand adjacent said two points by means of said claws, with the intermediate portion of said first strand being engaged and held by said tying bill lateral extension; a second guiding lever mounted for pivotal movement and having a second pair of fingers each having a claw engageable with said second strand at one of two spaced-apart points thereof; a second cam mounted on said drive shaft for rotation therewith; a second cam follower fixed to said second guiding lever for engagement with said second cam so as to cause movement of said second guiding lever toward said tying bill axially thereof, said second guiding lever fingers carrying along with them the portions of said second strand adjacent said two points by means of said second guiding lever finger claws as far as said second strand is engaged at its intermediate point between said two points by said tying bill lateral extension; gear means for rotating said tying bill about its axis so that said strands are wound on said tying bill lateral extension to form loops thereon entangled with each other; cam means for causing said tying bill to open and close its mouth as it is rotated, thereby cutting said second strand adjacent said loops and seizing said cut end; a pair of members having engageable teeth, one of said members being mounted for pivotal movement relative to the other for engagement of said teeth on said one member into said teeth on the other, thereby clamping said first strand adjacent one of said two points; a third guiding lever having a claw engageable with said first strand adjacent said knot at one side thereof; a third cam mounted on said drive shaft for rotation therewith; a third cam follower engaging with said third cam; a linkage connected to said third cam follower for a drive connection between said drive shaft and said third guiding lever so as to cause movement of said third guiding lever engaging with said first strand to strip off said loops from said tying bill lateral extension to form a weaver's knot, with said seized cut end of said second strand having been drawn through said loops as they are stripped off from said tying bill; said tying bill seizing said second strand cut end, said second guiding lever engaging with said second strand at the side of said knot opposite to said cut end, said clamping members seizing said first strand adjacent one of said two points, said third guiding lever engaging with said first strand adjacent said knot at said clamped side, and said first guiding lever engaging said first strand at the one side at least of said knot opposite to said clamped side, all cooperating to draw and tension said first and second strands thereby to tie said knot tightly; a pair of cutter blades one of which is carried by said third guiding lever for movement therewith while the other is mounted on said same third guiding lever for pivotal movement relative thereto and to said one blade; and means operable in cooperation with said third cam, third cam follower and linkage to effect said pivotal movement of said other blade to cause said blades to engage with each other, thereby cutting said first strand adjacent said knot at said clamped side.

14. A knotter for automatically tying together a first and a second strand of yarn in a weaver's knot, comprising: a typing bill rotatable about an axis and comprising an axial extension and a lateral extension constituting its mouth; means including a suction device for supporting portions of said strands so as to extend substantially in parallel with each other and transversely of said axis of rotation of said tying bill by the help of suction being applied to the end of said strands, with said first strand being supported crosswise of said axial extension of said tying bill; a first guiding lever mounted for pivotal movement and having a first pair of fingers each having a claw engageable with said first strand at one of two spaced-apart points thereof; a drive shaft; a first cam mounted on said drive shaft for rotation therewith; a first cam follower fixed to said first guiding lever for engagement with said first cam so as to cause movement of said first guiding lever away from said tying bill axially thereof, said first pair of fingers carrying along with them the portions of said first strand adjacent said two points by means of said claws, with the intermediate portion of said first strand being engaged and held by said tying bill lateral extension; a second guiding lever mounted for pivotal movement and having a second pair of fingers each having a claw engageable with said second strand at one of two spaced-apart points thereof; a second cam mounted on said drive shaft for rotation therewith; a second cam follower fixed to said second guiding lever for engagement with said second cam so as to cause movement of said second guiding lever toward said tying bill axially thereof, said second guiding lever fingers carrying along with them the portions of said second strand adjacent said two points by means of said second guiding lever finger claws as far as said second strand is engaged at a portion intermediate said two points by said tying bill lateral extension; gear means for rotating said tying bill about its said axis so that said strands are wound on said tying bill lateral extension to form loops thereon entangled with each other; cam means for causing said tying bill to open and close its mouth as it is rotated, thereby cutting said second strand adjacent said loops and seizing said cut end; a pair of clamping members having engageable teeth, one of said members being mounted for pivotal movement relative to the other for mutual engagement of said teeth, thereby clamping said first strand adjacent one of said two points; a third guiding lever having a claw engageable with said first strand adjacent said knot at said clamped side; a third cam mounted on said drive shaft for rotation therewith; a third cam follower engageable with said third cam; a linkage connected to said third cam follower for a drive connection between said drive shaft and said third guiding lever so as to cause movement of said third lever engaging with said first strand to strip off said loops from said tying bill lateral extension to form a weaver's knot, with said seized cut end of said second strand having been passed through said loops the they are stripped off; a fourth guiding lever having a claw engageable with said first strand adjacent the other of said two points; a fourth cam mounted on said drive shaft for rotation therewith; a fourth cam follower engaging with said fourth cam; a linkage connected to said fourth cam follower for a drive connection between said drive shaft and fourth guiding lever to move said fourth guiding lever engaging with said first stand in place of said first guiding lever farther away from said tying bill axially thereof beyond said first guiding lever so as to draw and tension said first strand thereby to tighten said knot in cooperation with said tying bill seizing said second strand cut end, said second guiding lever engaging with said second starnd at one side of said knot opposite to said seized cut end, said clamping members clamping said first strand adjacent one of said two points and said third guiding lever engaging with said first strand adjacent said knot at said clamped side; a pair of cutter blades one of which is carried by said third guiding lever for movement therewith while the other is mounted on said same third guiding lever for pivotal movement relative thereto and to said one blade; and means operable in cooperation with said third cam, third cam follower and linkage to effect said pivotal movement of said other blade to cause said blades to engage with each other, thereby cutting said first strand adjacent said knot at said clamped side.

References Cited

UNITED STATES PATENTS

| 2,678,229 | 5/1954 | Shortland | 289—3 |
| 2,821,421 | 1/1958 | Smith | 289—3 |
| 3,017,211 | 1/1962 | Trost | 289—3 |

LOUIS K. RIMRODT, Primary Examiner